United States Patent [19]

Eick

[11] Patent Number: 4,470,666
[45] Date of Patent: Sep. 11, 1984

[54] COLORED LIQUID CRYSTAL DISPLAY

[75] Inventor: Arnold R. Eick, Davison, Mich.

[73] Assignee: General Motors Corporation, Detroit, Mich.

[21] Appl. No.: 49,104

[22] Filed: Jun. 18, 1979

[51] Int. Cl.³ .............................................. G02F 1/13
[52] U.S. Cl. .................... 350/339 F; 350/345
[58] Field of Search ............... 350/345, 331 R, 339 F, 350/349, 350 F, 337, 338

[56] References Cited

U.S. PATENT DOCUMENTS

| | | | |
|---|---|---|---|
| 3,840,695 | 10/1974 | Fischer | 350/345 X |
| 3,899,786 | 8/1975 | Greubel et al. | 350/334 |
| 3,950,078 | 4/1976 | Zatsky | 350/345 |
| 4,097,130 | 6/1978 | Cole | 350/335 |
| 4,139,271 | 2/1979 | Yoda | 350/337 |
| 4,142,781 | 3/1979 | Baur et al. | 350/338 |
| 4,167,307 | 9/1979 | Cirkler et al. | 350/345 |

FOREIGN PATENT DOCUMENTS 1386714  3/1975  United Kingdom ............... 350/345

OTHER PUBLICATIONS

*Electronics*, Dec. 8, 1977, pp. 113–116, Bechtler, M. et al., "Dim Light is no Turnoff for Fluorescence-Activated LCD".

Primary Examiner—John K. Corbin
Assistant Examiner—Richard F. Gallivan
Attorney, Agent, or Firm—Warren D. Hill

[57] ABSTRACT

A twisted nematic liquid crystal cell is bounded by front and rear polarizers and a partially transmissive fluorescent color filter is placed behind the rear polarizer either as a coating on the polarizer or as a coating on a separate substrate. A light source behind the filter illuminates the display and ambient light incident on the face of the display provides illumination as well. The fluorescent filter enhances the light passing through the filter in a characteristic color band to provide a very bright display affording high contrast. Contrast is heightened by adding a small amount of pleochroic dye to the liquid crystal material. By using a plurality of colors in a predetermined pattern, the filter can provide a display illuminated in a variety of bright colors.

2 Claims, 3 Drawing Figures

COLORED LIQUID CRYSTAL DISPLAY

This invention relates to liquid crystal displays and particularly to such displays having a bright colored output.

Heretofore, liquid crystal displays have been designed for use in ambient lighting conditions or with back lighting for low ambient light conditions. Compromise desgns useful in all ambient light conditions are generally characterized by low contrast or marginal legibility in some light levels. Attempts to provide color displays by inserting ordinary filters or by using dichloric polarizers also tend to reduce the brightness or contrast of the display since such techniques reduce the light emission from the display even in the color region of interest. Moreover, any such color displays have been limited to the use of the same color in all portions of the display.

A liquid crystal display for use in an instrument panel of an automotive vehicle requires high contrast and high brightness for easy legibility in all ambient light conditions and a dark dead front appearance of that portion of the display not energized. It is also required that such a display be easily manufactured in high volume quantities and that the materials must be able to withstand high temperature and humidity conditions. It is desirable for flexibility in design that several colors be available in a single display.

It is, therefore, a general object of this invention to provide a liquid crystal display having high contrast in all ambient light conditions ranging from dark to full sunlight. It is another object to provide such a display having a bright colored light emission and it is a further object to provide such a color display having different colors in different areas of the display.

The invention is carried out by providing a liquid crystal cell having front and rear polarizers, a partially transmissive filter comprised of daylight fluorescent pigment, and a light source at the rear of the filter so that in the region of the characteristic color of the filter the light passing therethrough is enhanced to provide a high contrast display appearance. It is further contemplated that the filter be comprised of different color pigments in different areas in order to provide a pattern of various colors on the display.

The above and other advantages will be made more apparent from the following specification taken in conjunction with the accompanying drawings wherein like reference numerals refer to like parts and wherein.

Figure 1:
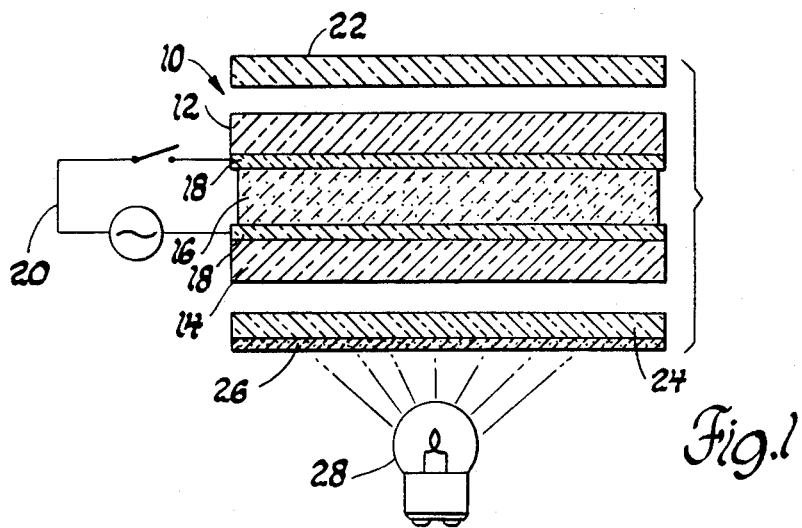
FIG. 1 is a diagrammatic cross-sectional view of a liquid crystal display according to one embodiment of the invention.

FIG. 1 depicts a liquid crystal display in cross section and comprises a liquid crystal cell 10 having front and rear plates of glass 12 and 14, respectively, spaced apart and having liquid crystal material 16 preferably of a twisted nematic type interposed between the plates. Electrodes 18 formed on the inner surfaces of the plates 12 and 14 are connected to energizing circuitry 20. Front and rear polarizers 22 and 24 are located in front and to the rear of the liquid crystal cell respectively. The two polarizers are polarized in the same direction so that substantially no light is transmitted through the cell when it is de-energized. As thus far described, the liquid crystal display is of standard construction and no further details are required. A partially transmissive fluorescent color filter 26 is applied as a film or coating on the rear face of the rear polarizer 24. A lamp 28 to the rear of the fluorescent filter is provided as a back light source.

In operation light from the lamp 28 passes through the fluorescent filter and is enhanced by the fluorescent filter 26 to provide a vivid pattern of light emitted through the front polarizer when the liquid crystal cell 10 is energized. The active ingredient of the color filter is a daylight fluorescent material which is well known and which is available in a wide array of colors. The daylight fluorescent pigments known by the trademark Day-Glo manufactured by Switzer Company of Cleveland, Ohio are typical of the materials useful for this application. Such daylight fluorescent pigments have the property of not only filtering the light passing therethrough to transmit only a selected band of wavelengths but also has the property of converting a substantial portion of the shorter wavelength light incident on the pigment to light having wavelengths in the color band characteristic of the pigment so that very bright color is emitted from the pigment. A conventional color filter merely removes undesired colors from the light passing therethrough and indeed even removes a small amount of the desired transmitted color so that a low brightness display results. However, the fluorescent filter serves somewhat as a source of the desired color so that the intensity of the desired color emitted therefrom is greater than the intensity of that color incident on the fluorescent filter from the source 28. Depending on the color of the pigment used, the fluorescent filter emits a light up to four times brigher than that available from an ordinary filter. To protect the fluorescent ink from fading due to exposure to ultraviolet rays when the display is used in sunlight, ultraviolet absorbers are incorporated in the polarizers 22 and 24.

The dark dead front appearance of the display in those areas where it is not energized is due to the efficient removal of a portion of the spectrum by the fluorescent filter and by using more efficient polarizers and liquid crystal cells than is customarily used in displays. The polarizers, for example, during the light blocking mode should have a light leakage of substantially less than 0.3 percent. Also, typical liquid crystal cells have an 8 to 10 micron spacing between the plates. However, a more efficient shutter effect is obtained by using a 15 micron spacing, although this is accompanied by a slight loss of speed in display changing.

Shutter efficiency is greatly enhanced by adding to the liquid crystal material a very small amount of pleochroic dye. The dye molecules switch along with the liquid crystal molecules in response to an applied electric field. This guest-host technology is well known in the liquid crystal art. In display areas which are not energized the dye attenuates light passing through the cell. Colors the same color as the dye as well as colors different from the dye are attenuated so the dark dead front appearance of the display is improved. The display areas which are energized have about the same transmittance as a non-dyed display because the dye molecules align with the liquid crystal molecules and effect essentially no attenuation. This increases the contrast ratio.

Figure 2:
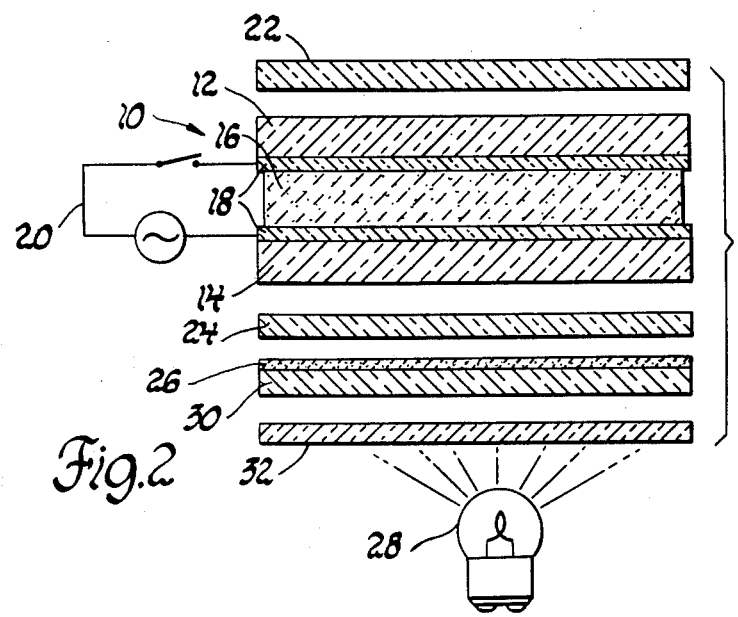
FIG. 2 is a diagrammatic cross-sectional view of a liquid crystal display according to a second embodiment of the invention.

Another embodiment of the display is illustrated in FIG. 2 wherein the liquid crystal cell 10, the polarizers 22 and 24 and the lamp 28 are the same. However, the fluorescent filter 26 is supported by a separate substrate 30 comprising a clear substance such as a clear polycarbonate plate. In addition, a transflector 32 comprising a diffusely reflecting translucent material is disposed between the color filter substrate 30 and the lamp 28. The transflector, as is well known in liquid crystal displays, allows passage of the light from the lamp 28 through the display but also fosters reflection of ambient light from the face of the display back through the fluorescent filter 26 and the display in order to improve the brightness resulting from the reflection of ambient light.

Figure 3:
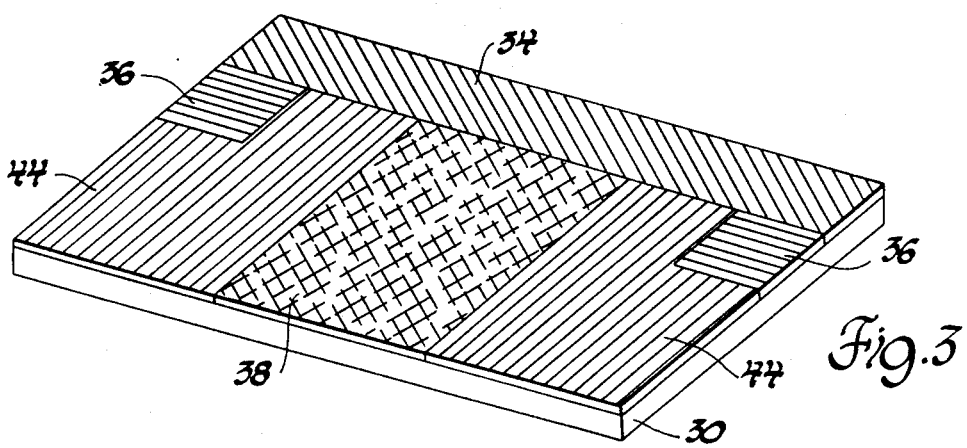
FIG. 3 is a perspective view of a filter of FIG. 1 or 2 displaying a pattern of different color pigments.

FIG. 3 shows one of many possible embodiments of a multicolor filter intended for use as a vehicle instrument panel display. As shown in the drawing, the substrate 30 or the polarizer 24 supports several different colors of fluorescent filter materials which are arranged in a predetermined pattern. The colors are used to divide the display into different functional areas. For example, a green pigment is used for illuminating a speedometer portion 34, a blue is used to illuminate turn signal arrows in areas 36, a fuel gage area 38 is colored orange whereas areas 44 containing warning indicators are red. A number of processes are useful for applying the film of various colored pigments in the proper pattern to the substrate 30 or to a polarizer sheet 24. Silkscreen printing, hot stamping or spray painting through masks are all viable methods of applying the daylight fluorescent material. In practice, satisfactory results were obtained by silkscreening multicolored inks onto the substrates, the inks comprising the daylight fluorescent pigments in a vinyl vehicle. Such inks were obtained from Nazdar Company, Chicago, Ill. A display 6 centimeters by 18 centimeters was illuminated by two three candlepower lamps during all ambient light conditions. The primary light source is the lamp or lamps 28 even in daylight conditions. However, in very bright light such as direct sunlight, the ambient light entering the display and reflected therefrom substantially augments the lamp illumination to preserve the high contrast and easy legibility.

It will thus be seen that the liquid crystal display according to this invention is readily manufacturable and has the advantages of a single or multi-color display system using a single liquid crystal cell and provides a bright high contrast display against a dead front background.

The embodiments of the invention in which an exclusive property or privilege is claimed are defined as follows:

1. A multi-colored liquid crystal display comprising
a twisted nematic liquid crystal cell having a layer of nematic liquid crystal material between two parallel plates, transparent electrodes on each plate and a voltage source selectively connected to the electrodes to establish an electric field across the liquid crystal material,
front and rear polarizers adjacent the front and rear faces of the liquid crystal cell respectively, the polarizers being polarized in the same direction,
a partially transmissive fluorescent color filter behind the rear polarizer,
means behind the color filter for directing visible light through the color filter and the liquid crystal cell,
the color filter having a coating of daylight fluorescent materials of different colors applied to a substrate in a predetermined multi-color pattern with different colors in different areas, each color of fluorescent material having the property of preferentially emitting light in certain characteristic wavelength bands when excited by light at shorter wavelengths, so that light passing through or incident on the filter is enhanced in the wavelength band of fluorescent emission to provide to each area of the display a bright color characteristic of the fluorescent material in the corresponding area of the filter.

2. A multi-colored liquid crystal display comprising
a twisted nematic liquid crystal cell having a layer of nematic liquid crystal material between two parallel plates, transparent electrodes on each plate and a voltage source selectively connected to the electrodes to establish an electric field across the liquid crystal material,
front and rear polarizers adjacent the front and rear faces of the liquid crystal cell respectively,
a partially transmissive fluorescent filter coating on the rear face of the rear polarizer,
a light source behind the fluorescent filter for directing visible light through the fluorescent filter and the liquid crystal cell,
the fluorescent filter having a coating of daylight fluorescent materials of different colors applied to a translucent substrate in a predetermined multi-color pattern with different colors in different areas, each fluorescent material having the property of preferentially emitting light in certain characteristic wavelength bands when excited by light at shorter wavelengths, so that light passing through the filter is enhanced in the wavelength band of fluorescent emission to provide to each area of the display a bright color characteristic of the fluorescent material in the corresponding area of the filter.

* * * * *